United States Patent Office.

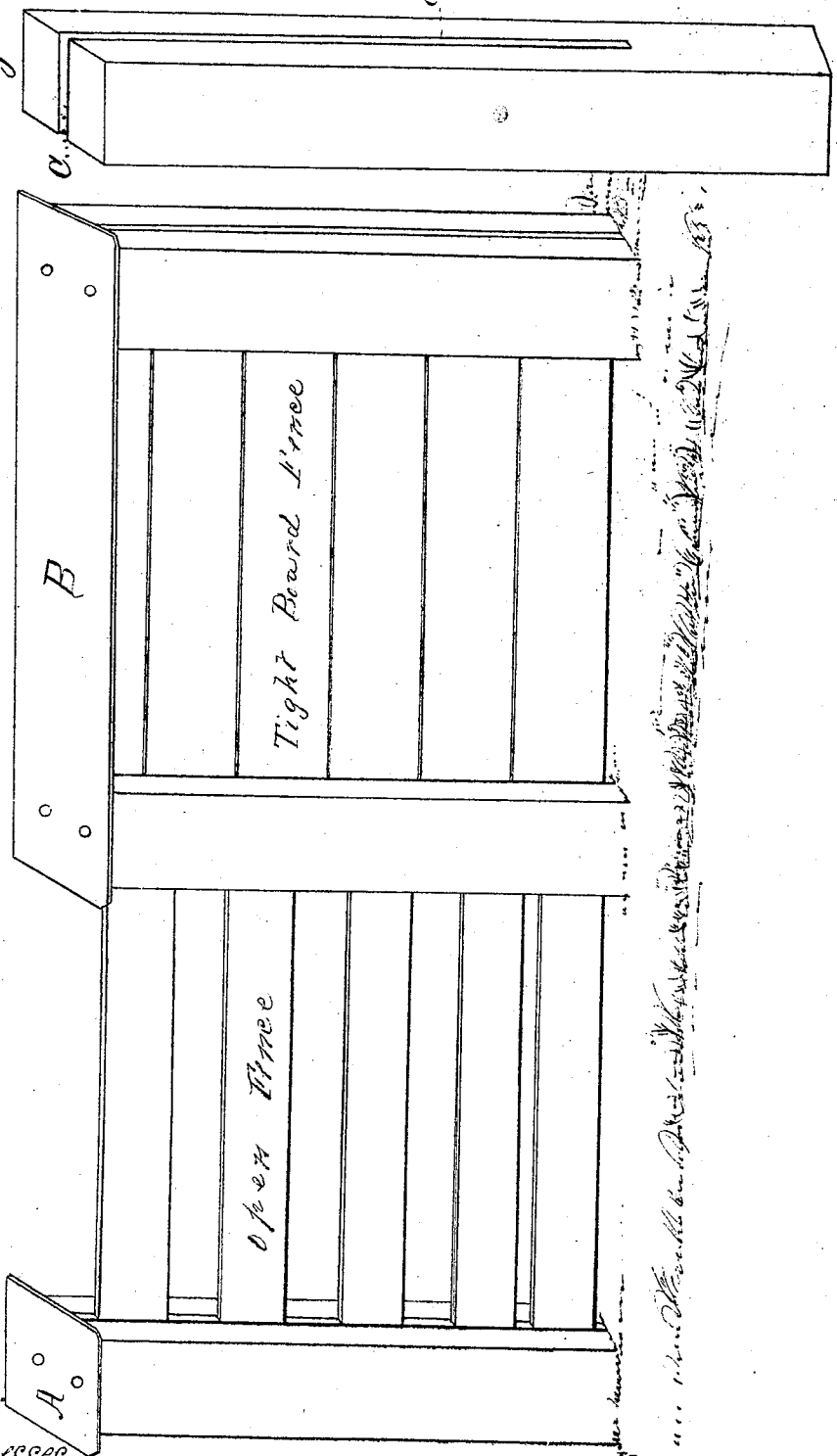

C. AUGUSTUS HAVILAND, OF DAVENPORT, IOWA.

Letters Patent No. 71,750, dated December 3, 1867.

IMPROVEMENT IN FENCES.

*The Schedule referred to in these Letters Patent and making part of the same.*

TO ALL WHOM IT MAY CONCERN:

Be it known that I, C. AUGUSTUS HAVILAND, of Davenport, in the county of Scott, and State of Iowa, have invented a new and improved Mode of Constructing Fence and Fence-Posts; and I do hereby declare that the following is a true and exact description thereof.

The nature of my invention consists in the construction of a fence-post, as shown on drawings, with slot or aperture, about one inch wide, extending across through the post and down to within about two or two and a half feet of the bottom of the post, or not so low for board fence; the placing of boards therein, as shown on drawings, for tight board fence, and of boards and pieces of boards, of any desired width, as shown on drawings, for open board fence; the placing at top of posts of a board or block, as shown on drawings, to keep top of post together, and protect boards from the weather; reference being had to the accompanying drawings, making a part of this specification, in which—

Figure 1 is a perspective view, showing, at one end, an open board fence, and at the other a tight board fence.

Figure 2 is a perspective view of post.

Figure 3 is a view of the small pieces of boards or blocks, of any desired width, used to separate the fence boards in open fence.

Letter A represents a square board or block, placed on top of post; letter B, a board cap-piece to extend from post to post; letter C, the slot or aperture in post.

What I claim for my invention, and desire to secure by Letters Patent, is—

1. The arrangement and combination of boards, blocks, and posts in the manner and for the purpose herein set forth.

2. The construction of a fence-post with slot or aperture C, in the manner and for the purpose herein described.

C. AUGUSTUS HAVILAND.

Witnesses:
HENRY NOLTE,
H. F. BONORDEN.